June 11, 1929.  T. MANSFIELD  1,716,704
IRRIGATION FURROW FORMING DEVICE
Filed Jan. 11, 1926  3 Sheets-Sheet 1
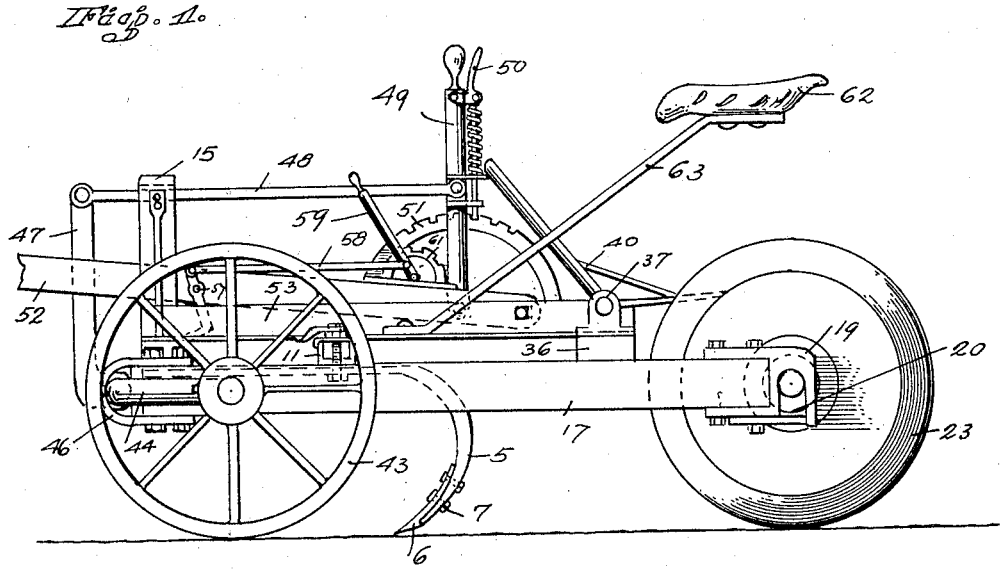
Inventor
THOMAS MANSFIELD
By
Attorneys.

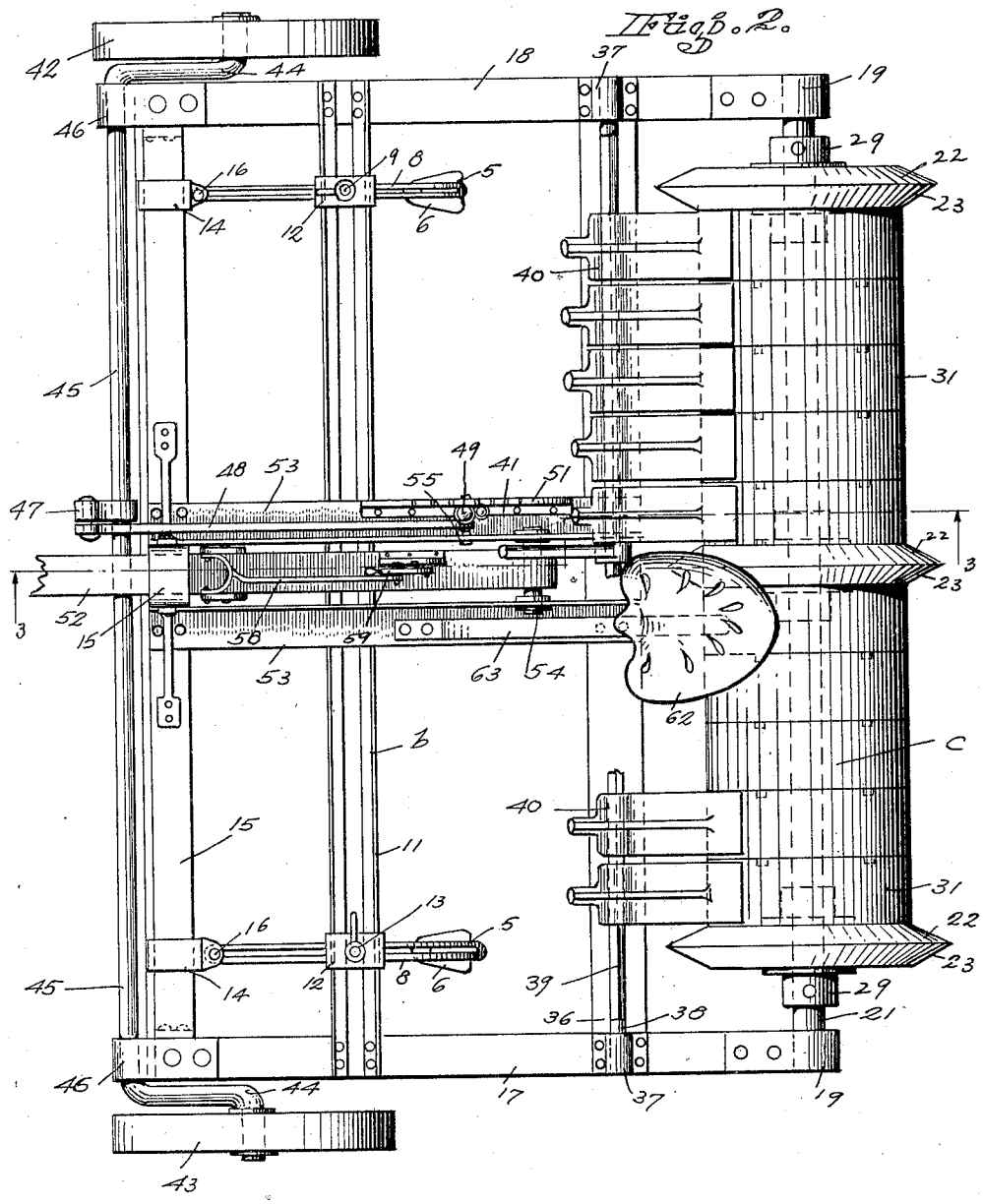

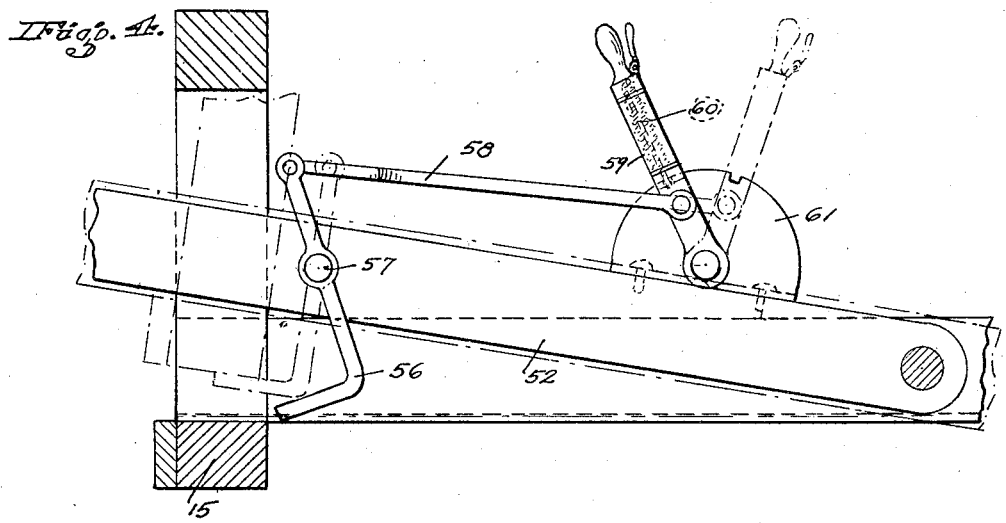
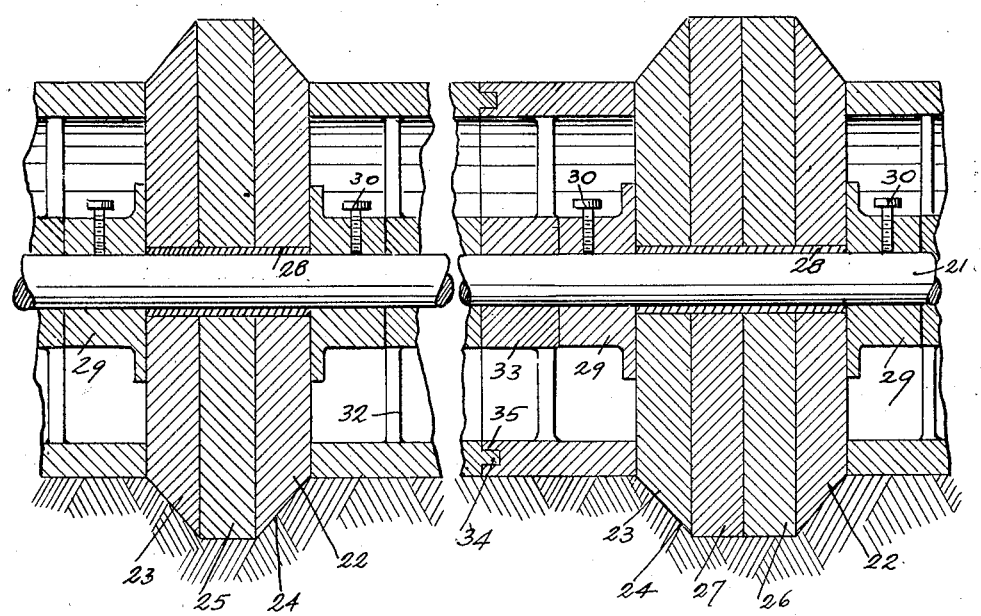

Patented June 11, 1929.

UNITED STATES PATENT OFFICE.

THOMAS MANSFIELD, OF RENO, NEVADA.

IRRIGATION FURROW-FORMING DEVICE.

Application filed January 11, 1926. Serial No. 80,645.

The present invention relates to agricultural implements, and has particular reference to implements employed for cutting one or more trenches in a field, orchard or the like for conveying irrigating water.

The general object of the invention is the provision of means adapted for facilitating the operation of adjusting the trench or furrow cutting tools vertically in order to engage the cutting tools with or disengage them from the ground, and to provide for obtaining a furrow of required depth.

Another object is the provision of a furrow-forming device located in alinement with and arranged for following the furrow cutting device and adapted for shaping the furrow with sloping side walls and to pack the earth between adjacent furrows.

A further object of the invention is the provision of means adapted for permitting the implement to be turned in a comparatively small space not greater than the length of the device at the end of the furrow.

The above and other objects are accomplished by instrumentalities pointed out in the following specification.

The invention is clearly defined in the claims.

A satisfactory embodiment of the invention is illustrated in the accompanying drawings forming part of the specification and in which Figure 1 is a side elevation of the device with the forward portion of the draft pole broken away.

Figure 2 is a plan view of Figure 1 with parts thereof broken away to disclose the construction and relation of other parts.

Figure 3 is a vertical cross section on the line 3—3 of Figure 2.

Figure 4 is an enlarged detail side elevation of the rear end portion of the draft pole; also showing a part of the frame in vertical section and means for adjusting the draft pole vertically.

Figure 5 is an enlarged detail vertical longitudinal section of a portion of one of the furrow shaping devices, and Figure 6 is a view similar to Figure 5, except that the furrow shaping device therein shown is adapted for shaping a relatively wide furrow.

In carrying out the present invention, I provide one or more furrow forming tools $a$, each consisting of a downwardly extending end portion 5 having a plow point 6 secured thereto in any preferred manner as by bolts 7. The upper end of the downwardly extending end portion $a$ terminates in a horizontal shank portion 8 which is pierced for the reception of bolts 9 and 10. The bolt 9 extends through a recessed cross beam 11 and through a plate 12 disposed transversely of the beam 11 and forms a bearing for an adjusting nut 13 screwed on the upper end of the bolt, and which operates to secure the shank 8 to the cross beam. The bolt 10 connects the free end portion of shank 8 to the terminal portions of a split collar 14 which extends around an end cross beam 15, the bolt 10 being secured by a nut 16.

In the embodiment illustrated, three furrow cutting tools are shown and the adjustable connection between the said tools and the cross beams 11 and 15 permits of the said furrow cutting tools being adjusted relatively to each other in a horizontal direction, so as to provide for cutting a plurality of furrows spaced for any desired distance apart within the limits of adjustment afforded by the beams 11 and 15. The side beams 17 and 18 are respectively connected to either end of the cross beams 11 and 15. The rear end portion of said beams 17 and 18 on the right in Figures 1, 2 and 3 are provided with fittings 19—19 which extend rearwardly and are provided with undercut recesses, one of which is shown in Figure 1 and indicated by 20. The recesses 20 form bearings for the opposite ends of a shaft 21 which is readily insertable into and removable from the recesses 20 by lifting the frame $b$ of which the hereinbefore mentioned cross beams and side beams form parts.

The shaft 21 forms part of a furrow-shaping device adapted for operating in the furrows formed by the cutting devices $a$ to slope the side walls of the said furrows and to pack the intervening earth between adjacent furrows so that the spaces will be relatively hard and smooth and the furrows themselves void of obstructions which would intervene to prevent the free flow of water.

In the embodiment shown, the furrow shaping devices are arranged in alinement with the furrow cutting tools and, as shown in Figures 1, 5 and 6, each of these devices consists of two oppositely disposed circular portions 22 and 23, the peripheries of which are beveled and slope in opposite directions in order to impart sloping side walls to the furrows, as indicated by 24 in Figures 5 and 6.

In Figure 2 it will be noted that the portions 22 and 23 bear one upon the other and provide for shaping a furrow of relatively narrow width.

In Figure 5 it will be noted that an intervening disk 25 is interposed between the portions 22 and 23, whereby the furrow-shaping device there shown operates to shape a furrow of greater width than the form shown in Figure 1.

In Figure 6 it will be noted that two disks 26 and 27 are interposed between the beveled portions 22 and 23 so that the device shown in Figure 6 is accordingly adapted for shaping a furrow of greater width than that shown in Figure 5. In arranging the members 22 and 23, together with the disks 25, 26 and 27 upon the shaft 21, it is preferable to use a bushing or sleeve, as indicated by 28 in Figures 5 and 6, this bushing being adapted to receive the shaft 21 and extend through the central openings in the said members and disk or disks. Lateral movement of the members 22 and 23 is prevented by collars 29 adjustably secured to the shaft 21 by set screws 30—30, the collars being adjustable so as to bear on the outer faces of the members 22 and 23, the set screws being adapted to turn into binding engagement with the shaft.

As shown in Figures 1 to 6 inclusive, the intervening spaces between the several shaping devices are filled with sections 31 of ground rollers, indicated generally by c. Each of the sections 31 is circular and of a diameter appreciably less than the diameters of the disks 24, 26 and 27 and corresponding approximately to the diameters of the inner edges of the beveled surfaces of the members 22 and 23. Each section is interiorly provided with a web 32 which carries a centrally disposed hub 33 adapted to nicely receive shaft 21.

As shown in Figures 2 and 6, the sections are locked together so as to rotate in unison, studs 34 being provided at the end of one section to fit into sockets 35 on the adjacent end of a succeeding section. A cross beam 36 is disposed rearwardly with respect to the intermediate cross beam 11 and secured to the side beams 17 and 18. Bearing members 37 are arranged at the opposite ends of cross beam 36 for the rounded end portions 38 of a rock shaft 39, the intermediate portion of which is non-cylindrical and has arranged thereon a series of scraper blades 40. The rock shaft is operated by a handle 41 to move the blades 40 into and out of engagement with the sections 31.

With the construction thus far described, it is obvious that the furrow shaping devices may be adjusted in correspondence with the furrow cutting tools, and the removability of the sections 31 permits of varying the lengths of the ground roller c to conform to the spacing between the furrow shaping devices. It will be further noted that the furrow shaping device forms a support for the rear end of the frame b, the forward end of which is supported by the ground wheels 42 and 43, which are connected to the crank shaped end portions 44 of a rock shaft 45 journaled in bearings 46 at the forward corner portions of the frame b. Shaft 45 is so disposed that when the crank shaped end portions 44 thereof extend horizontally, the ground wheels 42 and 43 support the furrow cutting tools 5 with their lower ground engaging end portions adjacent to the ground. The turning of rock shaft 45 so as to cause the crank shaped end portions 44 thereof to slope upwardly and rearwardly, results in the forward end portion of the frame moving downwardly and also the furrow-cutting tools a. The rock shaft 45 is operated to turn by a bell crank 47 rigidly secured at one end to the shaft as shown in Figure 3, and disposed so as to extend upwardly, the upper end being pivotally connected to one end of a link 48 which connects the bell crank to an operating lever 49. The operating lever 49 is provided with a dog 50 which engages a segmental rack 51 to lock the operating lever in any of its adjusted positions. A draft beam 52 extends forwardly from between a pair of longitudinally disposed braces 53 arranged in spaced relation at the middle portion of the frame and secured to the cross beams 15 and 36, a pivot pin 54 extending transversely through the braces and also through the rear end portion of the draft beam and forming a pivotal support therefor. The fulcrum 55 of the operating lever 49 is also secured to one of the braces 53 as shown in Figure 2.

In operation, the draft beam extends substantially at the angle shown in Figures 1 and 3, and when it is desired to turn the device at the end of a furrow, the same may be done in a relatively small space no greater than the length of the device by operating the rock shaft 45 so as to cause the front end portion of the frame to tilt upwardly and into contact with the draft beam, in which position the parts may be locked by operating a latch in the form of a bell crank 56 pivoted as at 57 to one side of the draft beam 52, the lower end of the latch underriding the front cross beam 15. In this position of the parts the ground wheels are elevated above the ground and the weight of the forward end of the frame is thrown upon the draft beam 52 whereupon the draft animals may be driven to turn the device upon the furrow shaping device at the rear of the frame. The latch 56 is connected by a link 58 to an operating lever 59 fulcrumed upon the draft beam and having a dog 60 which engages the teeth of a segmental rack 61 to lock the latch against movement in any of its adjusted positions. The operating handle 41 for the scraper blades, together with the operating lever 49 and the operating lever 59 are located so as to be accessible by the operator while seated upon the driver's seat 62 which seat is supported by a standard 63 secured to one of the braces 53.

Although I have shown and described one embodiment of my invention, it is to be understood that the same is susceptible of various changes; and I reserve the right to employ such as may come within the scope of the appended claims.

I claim:

1. An irrigating furrow forming machine comprising a frame, a plurality of laterally adjustable furrow cutting tools carried by the frame and having downwardly extending ground engaging portions, a plurality of rotatable furrow shaping devices adjustably connected to the rear end portion of the frame and in alinement with the furrow cutting tools, said furrow shaping devices including a shaft, and oppositely disposed beveled portions removably secured to the shaft together with intervening ground roller sections removably secured to the shaft and interposed between adjacent beveled members, said ground roller sections and beveled members cooperating to provide a support for the rear end of the frame, and means forming a support for the front end of the frame and including oppositely disposed ground wheels connected to the frame.

2. An irrigating furrow forming machine comprising a frame, a plurality of laterally adjustable furrow cutting tools carried by the frame and having downwardly extending ground engaging portions, a plurality of rotatable furrow shaping devices adjustably connected to the rear end portion of the frame and in alinement with the furrow cutting tools, each of said furrow shaping devices including oppositely disposed beveled members and an intervening circular member removably secured to the shaft and ground rollers comprising sections smaller in diameter than the furrow shaping devices and removably secured to the shaft and interposed between adjacent furrow shaping devices and cooperating therewith to provide a support for the rear end of the frame, and means forming a support for the front end of the frame and including oppositely disposed ground wheels connected to the frame.

3. An irrigating furrow forming machine comprising a frame, a plurality of furrow cutting tools arranged in spaced relation upon the frame and adjustably connected thereto and having downwardly extending ground engaging portions, a plurality of furrow shaping devices rotatably connected to the rear end of the frame and arranged in alinement with the furrow cutting tools, ground wheels forming a support for the front end of the frame, means connecting the ground wheels to the frame and adjustable angularly for permitting vertical adjustment of the front end of the frame, a draft pole pivotally connected to the frame and adapted to slope upwardly and forwardly therefrom when connected to a means for pulling the machine, and means carried by the draft pole and adapted to engage the forward end of the frame when the same is adjusted vertically to a position substantially parallel with the draft pole for the purpose described.

4. In a device of the type described, a plurality of cutters, a frame for supporting said cutters, said frame including transverse guideways, and means for adjusting said cutters along said guideways, and a roller consisting of a plurality of sections interchangeable for positioning certain of said sections in alignment with said cutters.

5. In a device of the type described, a frame, a tongue pivotally secured to said frame, means for supporting the rear of said frame, wheels for normally supporting the front of said frame and means for raising the front of said frame with respect to the tongue and for connecting the front with the tongue whereby the front wheels are supported free of the ground.

6. In a device of the type described, a frame, a tongue pivotally secured to said frame, means for supporting the rear of said frame, wheels for normally supporting the front of said frame, the front of said tongue being carried, means for raising the front of said frame with respect to said tongue, means for connecting said tongue and frame together, and means for lifting the front wheels clear of the ground so as to be supported by the tongue.

THOMAS MANSFIELD.